United States Patent [19]

Macdonald

[11] Patent Number: 4,668,025
[45] Date of Patent: May 26, 1987

[54] SEALED PIVOT JOINT

[75] Inventor: William J. J. Macdonald, Reading, England

[73] Assignee: The Secretary of State for Defence in Her Britannic Majesty's Government of the United Kingdom of Great Britain and Northern Ireland, London, England

[21] Appl. No.: 778,182

[22] PCT Filed: Feb. 14, 1985

[86] PCT No.: PCT/GB85/00058
§ 371 Date: Sep. 18, 1985
§ 102(e) Date: Sep. 18, 1985

[87] PCT Pub. No.: WO85/03680
PCT Pub. Date: Aug. 29, 1985

[30] Foreign Application Priority Data

Feb. 15, 1984 [GB] United Kingdom ............ 8403922

[51] Int. Cl.$^4$ .................... B62D 55/088; B62D 55/20
[52] U.S. Cl. ................................ 305/11; 198/851;
277/12; 305/58 R; 403/223; 403/226; 474/207
[58] Field of Search ............... 277/12, 138, 187, 189.5,
277/92; 403/223, 225, 226; 474/207; 198/851;
285/236, 383, 244, 242; 305/11, 42, 41, 43, 58
R, 58 PC

[56] References Cited

U.S. PATENT DOCUMENTS

| | | | |
|---|---|---|---|
| 647,046 | 4/1900 | Tessier | 474/207 X |
| 1,970,568 | 8/1934 | Knox | 474/207 X |
| 1,973,214 | 9/1934 | Lamb | 474/207 X |
| 2,389,874 | 11/1945 | Searles et al. | 474/207 X |
| 2,391,524 | 12/1945 | Sorensen et al. | 305/42 |
| 2,402,042 | 6/1946 | Haushalter | 305/42 X |
| 2,481,727 | 9/1949 | Deffenbaugh | 305/42 X |
| 2,553,646 | 5/1951 | Field | 305/42 |
| 2,610,094 | 9/1952 | Grandgirard | 305/42 |
| 3,464,722 | 9/1969 | Larkin | 277/101 X |
| 3,466,067 | 9/1969 | Orain | 285/244 |
| 4,171,920 | 10/1979 | Kramer et al. | 403/223 |
| 4,195,887 | 4/1980 | Ruddell | 305/42 |
| 4,395,074 | 7/1983 | Haldimann et al. | 305/43 |
| 4,526,271 | 7/1985 | Finnighan | 198/851 X |

FOREIGN PATENT DOCUMENTS

| | | | |
|---|---|---|---|
| 467529 | 10/1928 | Fed. Rep. of Germany | |
| 591033 | 1/1934 | Fed. Rep. of Germany | |
| 670666 | 1/1939 | Fed. Rep. of Germany | |
| 692604 | 6/1940 | Fed. Rep. of Germany | |
| 802908 | 10/1949 | Fed. Rep. of Germany | 474/207 |
| 817084 | 10/1951 | Fed. Rep. of Germany | |
| 1085433 | 7/1960 | Fed. Rep. of Germany | |
| 3005002 | 9/1980 | Fed. Rep. of Germany | |
| 1114751 | 4/1956 | France | |
| 2039836 | 8/1980 | United Kingdom | |
| 742240 | 6/1980 | U.S.S.R. | 305/58 R |

Primary Examiner—Allan N. Shoap
Attorney, Agent, or Firm—William R. Hinds

[57] ABSTRACT

A sealed pivot joint suitable for joining together the adjacent links of an endless belt, for example, a tank track. The joint has a bearing (10) rotatable on a pin (8), and an elastic sleeve (20) whose extremities are in sealed relationship to the pin and bearing thereby preventing the ingress of abrasive material into, and the egress of lubricant from, the bearing surface (12). The sleeve is maintained in circumferential tension by tensioning members (14, 16, 18) between the sleeve and the pin which act to prevent wrinkling of the sleeve when the pin and bearing are rotated relative to one another thereby reducing abrasive wear on the outer surface of the sleeve.

5 Claims, 3 Drawing Figures

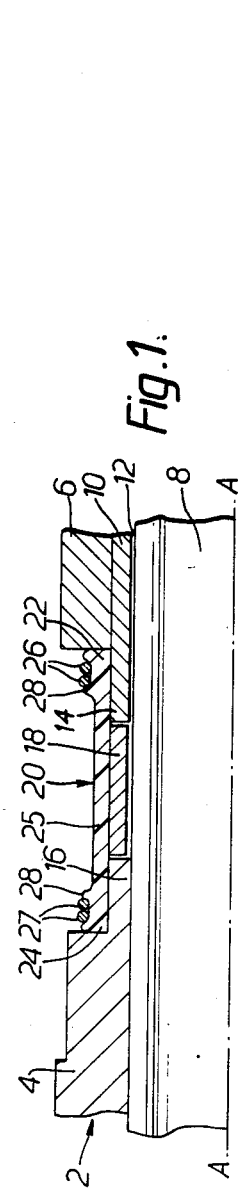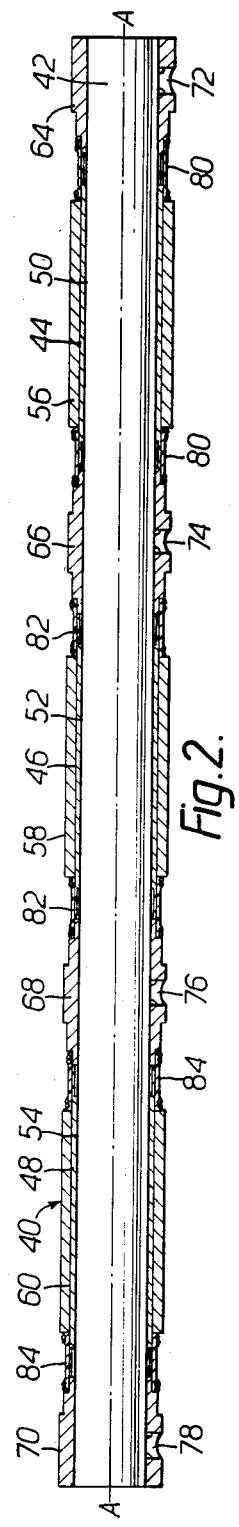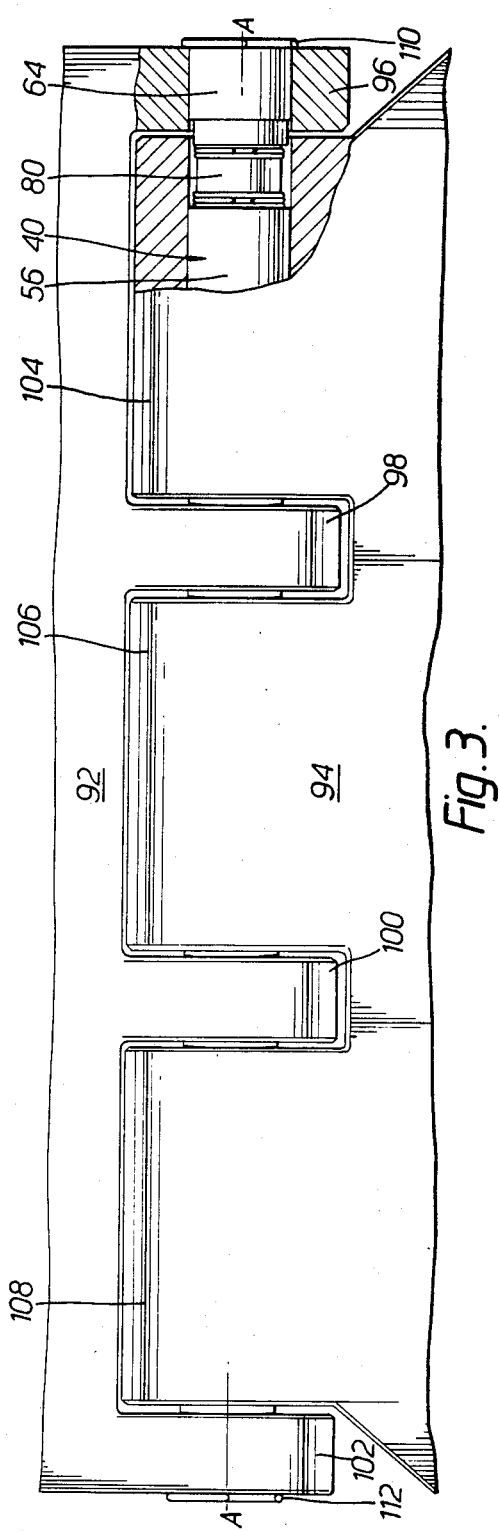

SEALED PIVOT JOINT

TECHNICAL FIELD

This invention relates to sealed pivot joints of the type in which a pin pivots within a bearing. It is particularly, but not exclusively, applicable to hinge joints suitable for joining the adjacent links of endless belts such as used for the tracks of tracked vehicles and conveyor belts.

BACKGROUND ART

Sealed pivot joints are known in which the interface between the pin and the bearing is protected against the ingress of abrasive material, or the loss of lubricant, by one or more sleeves the axial extremities of each being sealed to the pin and bearing respectively, either directly or by way of intermediate sealing members. In applications where the angular displacement of the pin relative to the bearing is limited the interface between the sleeve and the member to which it is sealed may be made as a stationary seal to reduce wear.

In known sealed pivot joints utilising such stationary seals the angular displacement of the ends of the sleeve that results when the pin and bearing oscillate relative to one another is accomodated by providing the sleeve with folds or corrugations that are free to flex and distort. However, when such sleeves are used to seal pivot joints that are used in abrasive environments it has been found that the outer surfaces of the sleeves wear preferentially in the vicinity of the corrugations. This limits the useful life of the sleeve resulting in the need more frequent maintenance of the pivot joints.

It is an object of the invention to provide a sealed pivot joint which is less susceptible to such preferential wear.

DISCLOSURE OF THE INVENTION

According to the invention there is provided a sealed pivot joint having a pin rotatable in a bearing characterised in that there is included an elstic sleeve disposed about the pin, the sleeve having a first and second axial extremity in sealed relationship with the bearing and the pin, respectively, and an intermediate portion maintained in circumferential tension by one or more tensioning members disposed within the sleeve.

The circumferential tensioning of the sleeve acts to prevent the sleeve wrinkling when the pin and bearing oscillate relative to one another.

The tensioning members may comprise a suitably configured portion of the pin, of the bearing end portion, a cylinder rotatably disposed on the pin between the pin and the elastic sleeve, or a combination of these.

The elastic sleeve is preferably of chloroprene polymer. The seals may be maintained by wire or garter springs at each extremity, but the preferred arrangemment is to use two pairs of circlips, one pair being located at each of the extremities of the sleeve by a pair of spaced circumferential ribs formed on the outer surface of the sleeve during its manufacture. Sealing by adhesives has been found to be unsatisfactory with a chloroprene polymer sleeve because the sleeve develops cuts on its inner surface along the edge of the adhesive area next to the intermediate portion of the sleeve, although it may be satisfactory with a sleeve of a different material.

DESCRIPTION OF THE DRAWINGS

Embodiments of the invention will now be described by way of example only with reference to the accompanying drawings of which—

FIG. 1 is an axial section of a sealed pivot joint showing one of the elastic sleeves sealing the joint;

FIG. 2 is an axial section of a pivot cartridge having three bearing surfaces, each being sealed by sleeves in the manner shown in FIG. 1; and FIG. 3 is a part cut-away view of the pivot cartridge of FIG. 2 applied between the adjoining track links of an endless track of a tracked vehicle.

Referring to FIG. 1 there is shown a pivot joint 2 which provides articulation between a pin collar 4 and a bearing collar 6 so as to permit relative angular rotation about an axis A. The joint 2 includes a pin 8 which is a running fit in an annular bearing 10 at a bearing surface 12, the bearing 10 being fixed within the bearing collar 6. The bearing 10 extends axially beyond the bearing collar 6 in a direction towards the pin collar 4 to provide an annular support collar 14. The pin collar 4 is an interference fit on the pin 8, the axial extremity of the pin collar 4 nearer the bearing collar 6 forming an annular support collar 16 of the same external diameter as the annular collar 14. A rigid, cylinder 18, constituting with the support collars 14 and 16 the tensioning members, is freely mounted co-axially on the pin 10 and has the same external diameter as the annular collars 14 and 16, and occupies the gap between them.

A chloroprene polymer sleeve 20 having axial extremities 22 and 24, and an intermediate portion 25 is located circumjacent the support sleeve 18. The axial extremities 22 and 24 are sealed to the support collars 14 and 16, respectively, by pairs of spring steel circlips 26 and 27. Each pair of circlips is retained in position by a pair of parallel, circumferential ribs 28 moulded integrally with sleeve 20. The sleeve 20 has an untensioned inner diameter which is smaller than the external diameter of the support collars 14 and 16 and the support sleeve 18. In use the circumferential tension induced in the elastic sleeve 20 by the support collars 14 and 16 and the cylinder 18 acts to prevent wrinkling or corrugation of the sleeve 20 when the members 4 and 6 are angularly displaced with respect to one another about the axis A, although wrinkling may occur if the displacement is sufficiently large.

In the embodiment of FIG. 1 the sleeve 20 has an untensioned inner diameter of 24 mm, is 1 mm thick and has a length of 20 mm. The annular collars 14 and 16 and the cylinder 18 have external diameters of 28 mm. Each pair of circlips 26 and 27 is arranged so that the gap between the ends of each circlip do not overlap to ensure that the sleeve is compressed to form a seal round all its periphery.

This arrangement allows a relative angular displacement of more than 15° to be imparted to the sleeve extremities 22 and 24 without wrinkling the sleeve 20. Slippage may take place between the inner surfaces of the sleeve extremities and the outer diameters of the collars 14 and 16 at large angular displacement but this can be used advantageously when initially setting the sleeve in position.

A further advantage of the non-corrugating property of the sleeve according to the present invention is that the exterior of the sleeve may be covered with a protective layer of mastic material such as a preformed sealant strip as it will not be subject to disturbance by moving folds as occurs if used with previously known sleeve arrangements. Such a mastic layer further extends the wear life of the sleeve seals of the pivot joint in abrasive environments.

A particular application of the invention as hereinbefore described with reference to FIG. 1 is illustrated in FIG. 2, namely a pivot cartridge 40 suitable for use in joining the adjacent links of an endless belt.

The cartridge 40 comprises a pin 42 which is a running fit in three annular bearings 44, 46 and 48 at bearing surfaces 50, 52 and 54 respectively. Bearing collars 56, 58 and 60 are fixed co-axially on the bearings 44 to 48 respectively. Pin collars 64, 66, 68 and 70 are each an interference fit on the pin 42 and are fixed relative to it by weld at the base of radial holes 72, 74, 76 and 78 in the collars 64 to 70 respectively.

Each of the bearing surfaces 50 and 54 is sealed by means of a pair of sleeves 80, 82 and 84 between the respective bearings 44 to 48 and its two neighbouring pin collars 64 and 66, 66 and 68, 68 and 70, in the manner illustrated in FIG. 1.

In FIG. 3 there is illustrated the use of the pivot cartridge 40 as hereinbefore described with reference to FIG. 2 to join adjoining track links 92 and 94 of an endless track. The track links 92 and 94 are respectively provided with inter-digitating lugs 96 to 102 and 104 to 108. The track links 92 and 94 are able to articulate relative to each other by means of the pivot cartridge 40 disposed within the inter-digitating lugs 96 to 108 such that the pin collars 64 to 70 connect the pin (8) to lugs 96 to 102 of the link 92 and bearing collars 56 to 60 connect the bearings (44–68) to the lugs 104 to 108 of the link 94.

The cartridge 40 is located in the track links 92 and 94 by means of two S-hooks 110 and 112 welded to respective ends of the cartridge 40 and to the track link 92. The weld is light enough to be readily broken to allow easy replacement of the cartridge 40.

In the particular application illustrated with reference to FIG. 3 the degree of articulation to be accommodated by the pivot joint is determined by the number of teeth on the vehicle sprocket wheel (not shown) with which the track is to be engaged, a 12 tooth sprocket wheel requiring an articulation of 1/12th of 360°, ie 30°, between successive track links. The cartridge 40 is installed with the links 92 and 94 relatively inclined at an angle midway between the limits of intended articulation in order that the sleeves will, in this example, be operative between ±15°.

A particular advantage of this assemblage is that once a pivot cartridge has been assembled in clean condition the bearing surfaces are sealed from contamination before the cartridge is inserted through the articulating lugs of the track links. This permits the pivot joint to be replaced in an adverse environment without risk of contamination of the bearing surfaces.

I claim:

1. A sealed pivot joint comprising: a cylindrical pin rotatable in a member defining a bearing circumferentially surrounding a portion of said pin, said bearing having affixed thereto a fixed bearing collar surrounding a portion of the bearing, said bearing and said fixed bearing collar defining a first annular sleeve support collar extending axially therefrom, said pin having affixed thereto a fixed pin collar surrounding a portion of the pin and having an extension extending axially therefrom and defining a second annular sleeve support collar, said first and second annular sleeve support collars extending axially in a direction toward each other and spaced axially apart; a separate third annular sleeve support collar freely mounted on said pin interjacent said first and second annular sleeve support collars, all three of said support collars being of substantially the same external diameter; and an elastic sleeve disposed in circumferential tension circumjacent the three sleeve support collars, said elastic sleeve having a first and a second axial extremity secured in sealed relationship with said first and second sleeve support collars of the pin and the bearing respectively.

2. A sealed pivot joint as claimed in claim 1 wherein each of said axial extremities of the elastic sleeve are secured in sealed relationship with the respective support collar by a pair of co-adjacent circlips.

3. A sealed pivot joint as claimed in claim 1 wherein the pin is rotatable in an axially spaced plurality of said bearings, the intermediate bearings being each provided with a fixed bearing collar having an opposingly extending pair of first annular sleeve support collars, and the pin being provided with a fixed pin collar interjacent each consecutive pair of bearings, each pin collar being provided with an opposingly extending pair of second annular sleeve support collars, thereby permitting one of said freely mounted sleeve support collars and said elastic sleeves to be disposed interjacent each pin/bearing axial interface.

4. A sealed pivot joint as claimed in claim 3 configured as a pivot cartridge for pinning together a first and a second link of an endless belt, said links having inter-digitating lugs provided with alignable bores through which a pivot pin is insertable, wherein said pin collars and said bearing collars are all radially dimensioned to provide an interference fit with the bores of the lugs and axially dimensioned and disposed to provide that, when the cartridge is fully driven home through the bores of the interdigitated lugs, all the pin collars are engaged with the lugs of the first of the said two links and all the bearing collars are engaged with the lugs of the second of said two links.

5. A sealed pivot joint as claimed in claim 4, further comprising a plurality of jointed links to define an endless belt, said belt characterized in that each pair of adjacent links is joined by a structure identical to said pivot cartridge.

* * * * *